(12) United States Patent
Ripley

(10) Patent No.: US 11,834,874 B1
(45) Date of Patent: Dec. 5, 2023

(54) SAFETY GATE LATCH FOR A LIVESTOCK TRAILER

(71) Applicant: John Randal Ripley, Gustine, TX (US)

(72) Inventor: John Randal Ripley, Gustine, TX (US)

( * ) Notice: Subject to any disclaimer, the term of this patent is extended or adjusted under 35 U.S.C. 154(b) by 642 days.

(21) Appl. No.: 17/072,285

(22) Filed: Oct. 16, 2020

Related U.S. Application Data

(60) Provisional application No. 62/915,904, filed on Oct. 16, 2019.

(51) Int. Cl.
| | | |
|---|---|---|
| *B60P 3/04* | (2006.01) | |
| *E05C 1/10* | (2006.01) | |
| *A01K 1/00* | (2006.01) | |
| *E05B 53/00* | (2006.01) | |
| *E05B 85/04* | (2014.01) | |
| *E05B 65/00* | (2006.01) | |
| *A01K 1/02* | (2006.01) | |

(52) U.S. Cl.
CPC ............. *E05C 1/10* (2013.01); *A01K 1/0035* (2013.01); *A01K 1/0272* (2013.01); *B60P 3/04* (2013.01); *E05B 53/001* (2013.01); *E05B 65/0007* (2013.01); *E05B 85/04* (2013.01); *E05Y 2900/516* (2013.01)

(58) Field of Classification Search
CPC ...... E05C 1/10; E05B 53/001; E05B 65/0007; E05B 85/04; E05Y 2900/516; B60P 3/04; B60P 3/42; A01K 1/0035; A01K 1/0272; B60J 5/047; B60J 5/0486; B60J 5/0487; B60J 5/049; B60J 5/0497
See application file for complete search history.

(56) References Cited

U.S. PATENT DOCUMENTS

| | | | | |
|---|---|---|---|---|
| 4,566,404 | A * | 1/1986 | Instone | A01K 1/0272 119/400 |
| 5,887,928 | A * | 3/1999 | Fenske | B60P 3/04 119/412 |
| 6,895,897 | B1 * | 5/2005 | Culp | B60P 3/04 119/412 |
| 7,628,436 | B1 * | 12/2009 | Cutler | B60P 3/04 119/412 |
| 2002/0061246 | A1 * | 5/2002 | Bonsall | A01K 15/02 414/537 |
| 2006/0048715 | A1 * | 3/2006 | Cupps | B60P 3/04 119/412 |
| 2010/0066041 | A1 * | 3/2010 | Metzger | B60P 1/027 280/423.1 |
| 2014/0252791 | A1 * | 9/2014 | Renforth | B60R 21/12 296/24.31 |

* cited by examiner

*Primary Examiner* — Gregory A Blankenship
(74) *Attorney, Agent, or Firm* — Kenneth L. Tolar

(57) ABSTRACT

A safety latch mechanism for anchoring an open center gate in a livestock trailer includes a spring-biased post attached to the center gate's free edge having a lifting lever at an upper end. An arcuate track embedded within the truck bed traces the path of the center gate's free edge when moving between a fully opened and a fully closed position. The track includes a series of juxtaposed, segregated compartments for receiving a lower end of the post. Accordingly, the center gate can be locked in a multitude of angular positions between the fully open and fully closed positions by lifting the lever and releasing it into one of the compartments.

9 Claims, 9 Drawing Sheets

SAFETY GATE LATCH FOR A LIVESTOCK TRAILER

CROSS REFERENCE TO RELATED APPLICATIONS

This application claims priority of provisional application No. 62/915,904 filed on Oct. 16, 2020, the specification of which is incorporated herein by reference.

BACKGROUND OF THE INVENTION

The present invention relates to a uniquely designed safety latch that assists a user with loading livestock onto a trailer.

DESCRIPTION OF THE PRIOR ART

Livestock are routinely loaded onto a trailer for transport to markets or alternative herding locations. A typical livestock trailer includes a center gate for segregating the livestock into separate groups or for confining livestock near the front end of the trailer. In order to load the livestock, a worker will use a loading ramp to get the livestock into the trailer and the center gate to prod the animals toward the front of the trailer. However, because an unlatched center gate is freely movable with little resistance, a typical farm animal, weighing anywhere from 1400-2400 pounds, can easily overpower a worker handling the gate. If claustrophobic or stubborn animals forcefully resist maneuvering, the worker can be overmatched, causing serious injury or death.

Accordingly, there is currently a need for a device that facilitates loading livestock onto a trailer. The present invention satisfies that need by providing a latching mechanism for an internal center gate that is selectively anchorable to multiple locations along a curved track to prevent an open gate from being moved by a resisting animal.

SUMMARY OF THE INVENTION

The present invention relates to a safety latch mechanism for anchoring an open center gate in a livestock trailer. The device includes a spring-biased post attached to the center gate's free edge having a lifting lever at an upper end. An arcuate track embedded within the truck bed traverses the path of the center gate's free edge when moving between a fully opened and a fully closed position. The track includes a series of juxtaposed, segregated compartments for receiving a lower end of the post. Accordingly, the center gate can be locked in a multitude of angular positions between the fully open and fully closed positions by lifting the lever and releasing it into one of the compartments.

It is therefore an object of the present invention to provide a latch that assists a user with safely loading livestock onto a trailer.

It is therefore another object of the present invention to provide a latch for a livestock trailer that secures a center gate in a multitude of angular positions.

It is yet another object of the present invention to provide a latch for a livestock trailer that prevents livestock from moving an open center gate.

Other objects, features, and advantages of the present invention will become readily apparent from the following detailed description of the preferred embodiment when considered with the attached drawings and the appended claims.

DESCRIPTION OF THE PREFERRED EMBODIMENT

Figure 1:
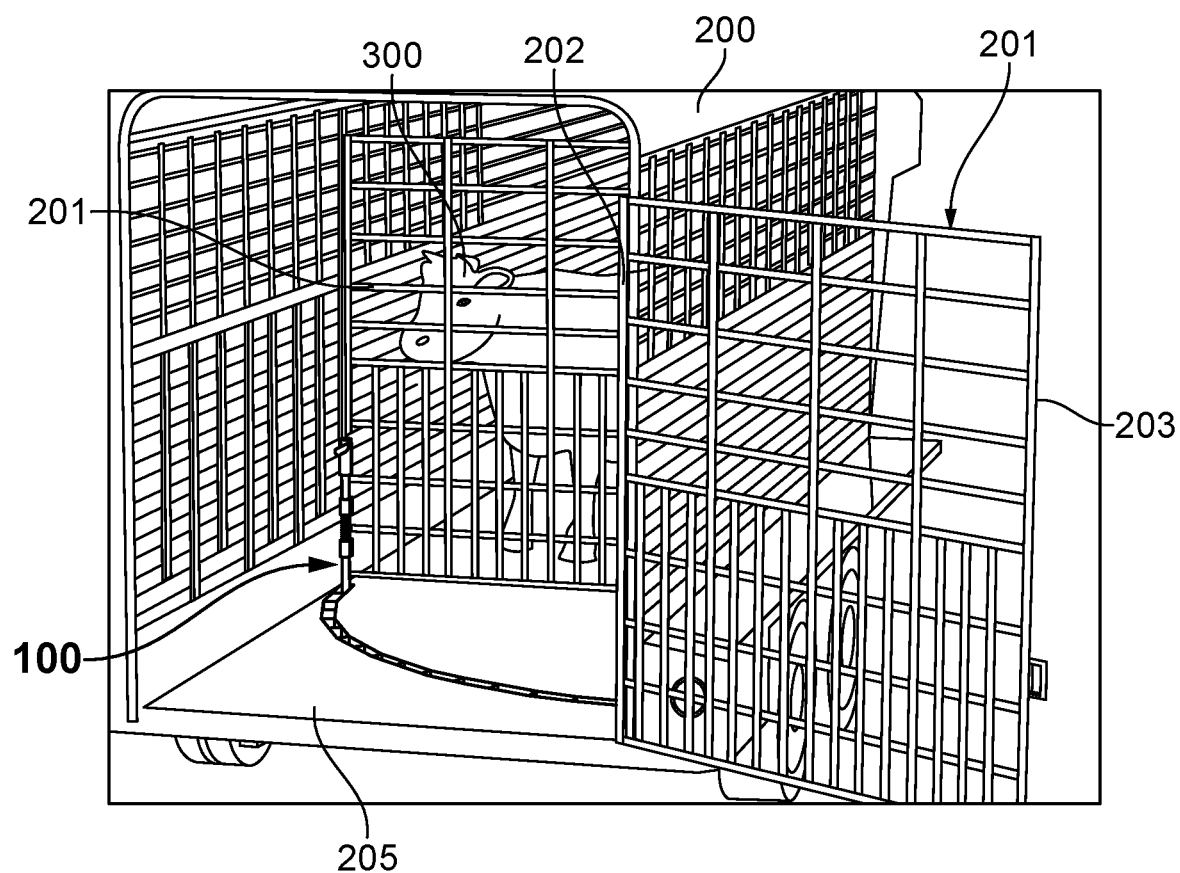
FIG. 1 is a perspective view of a safety gate latch according to the present invention installed within a livestock trailer.
Figure 2:
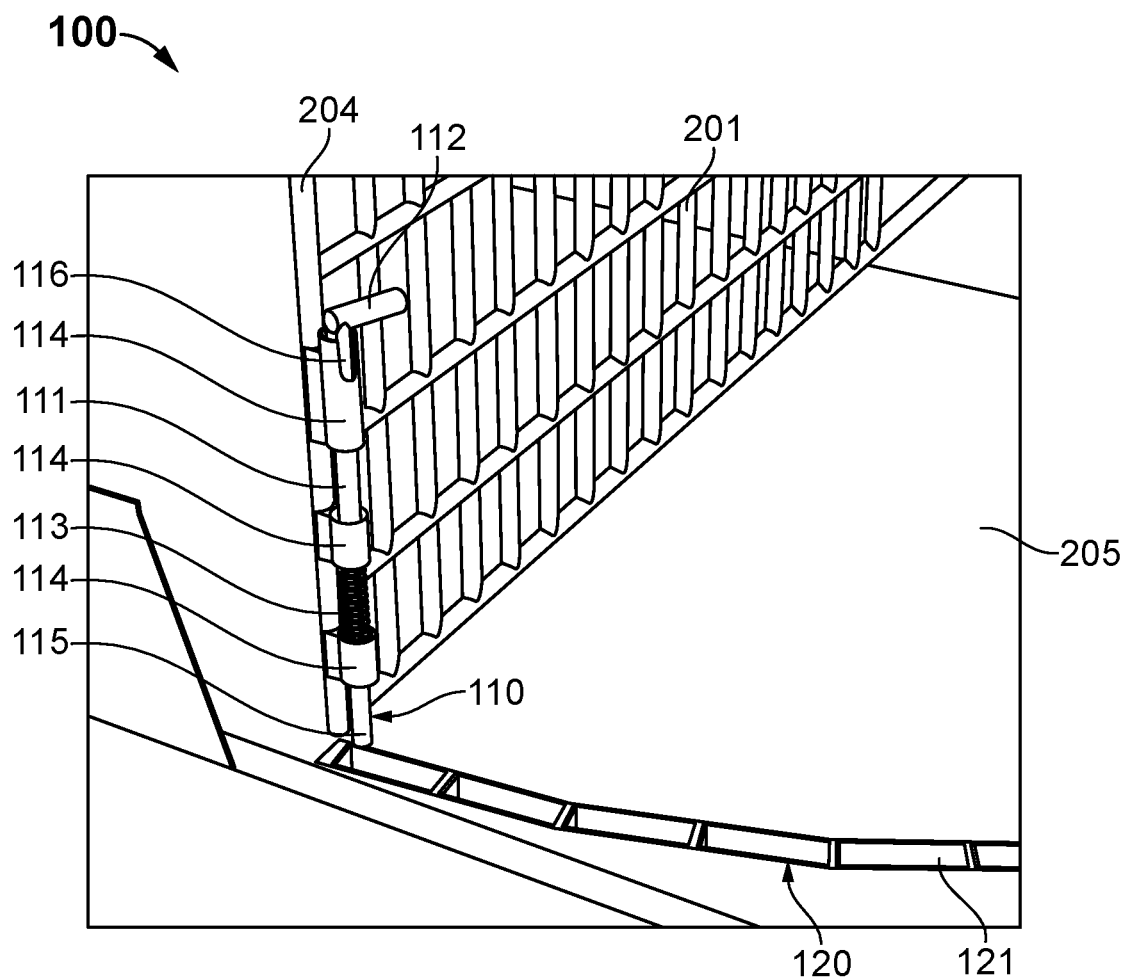
FIG. 2 is an isolated view of a first embodiment of the present invention.
Figure 3A:
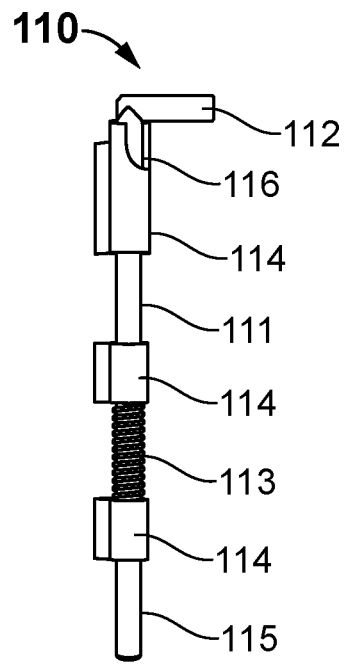
FIG. 3A depicts the latch in a disengaged position.
Figure 3B:
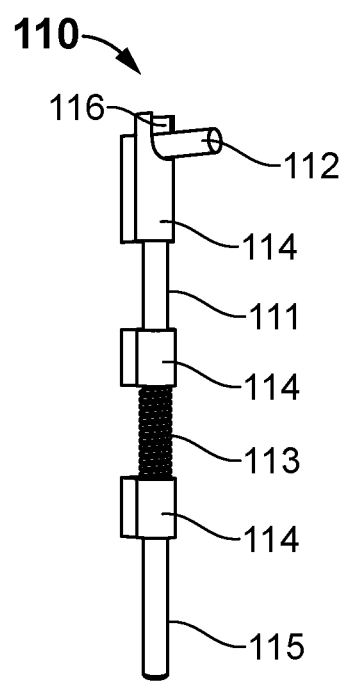
FIG. 3B depicts the latch of FIG. 3A in an engaged position.
Figure 4:
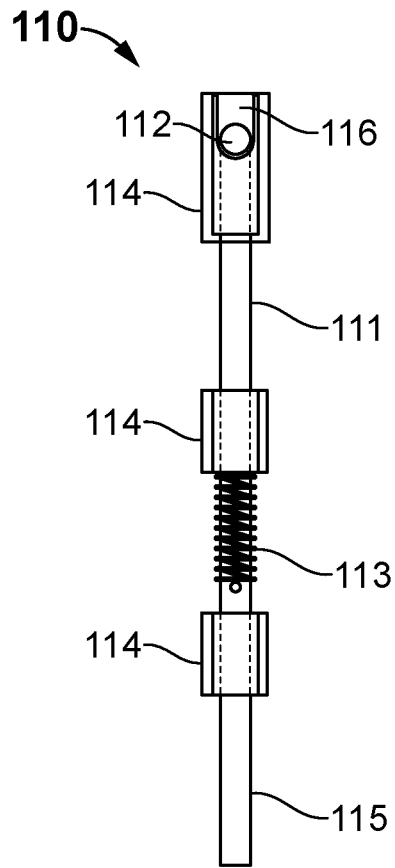
FIG. 4 is a front view of the latch of FIGS. 3A and 3B.
Figure 5:
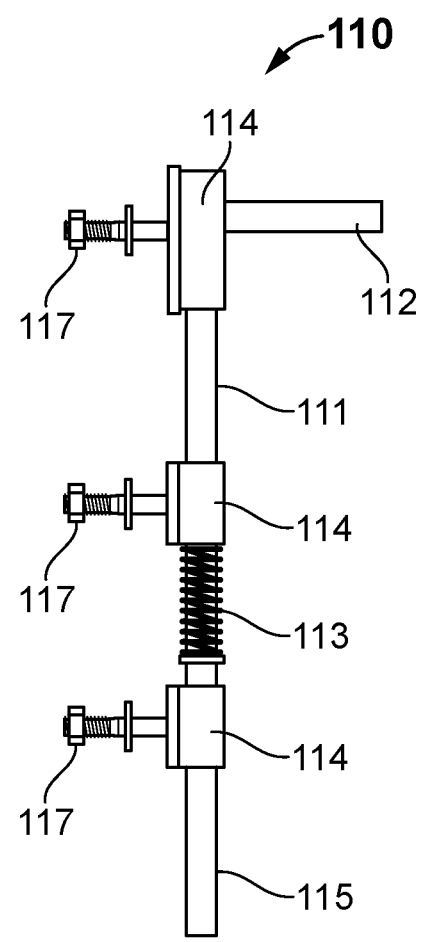
FIG. 5 is a side view of the latch.
Figure 6:
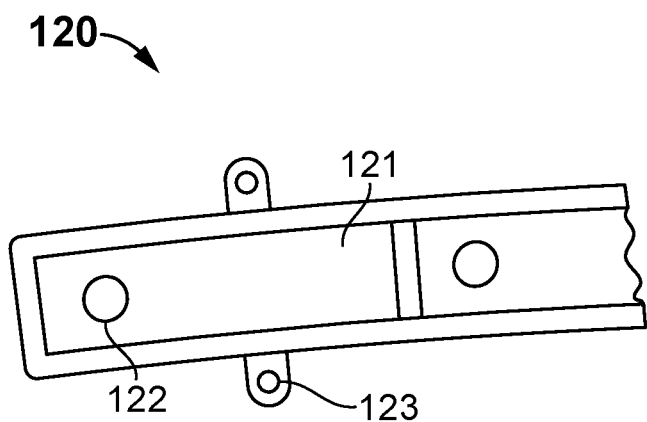
FIG. 6 is a top, sectional view of the guide track.
Figure 7:
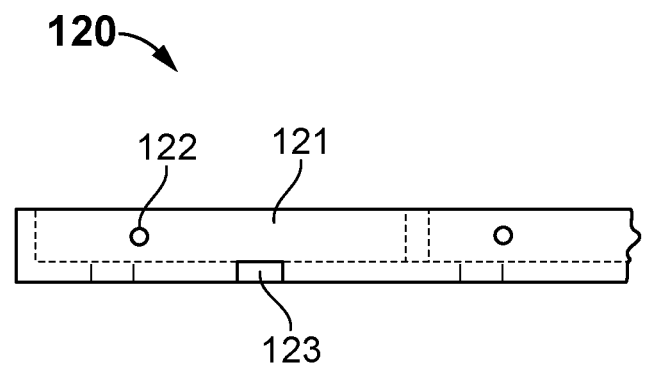
FIG. 7 is a side view of the guide track.
Figure 8:
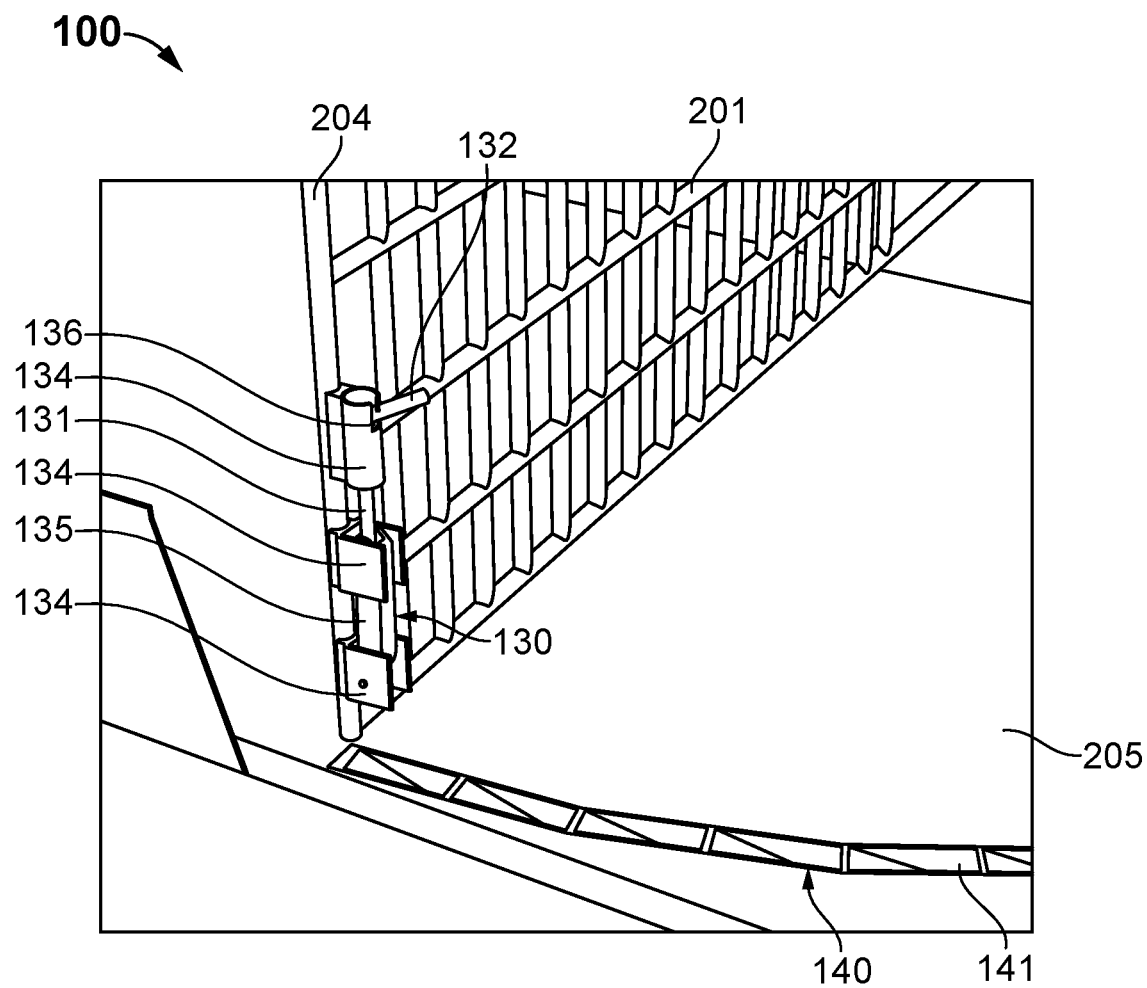
FIG. 8 depicts a second embodiment of the safety gate latch according to the present invention.

The present invention relates to a safety latch mechanism 100 for a livestock trailer 200. A typical livestock trailer 200 includes a cargo compartment defined by a horizontal bed 205, a pair of opposing sidewalls, a front wall and an openable rear that provides selective access to the cargo compartment. Within the cargo compartment is one or more internal swinging gates 201 that segregate multiple groups of animals 300, or confines a single group to the front portion of the cargo compartment. The gate 201 includes a first side 202 hingedly connected to a sidewall and an opposing, second free edge 203 having a riser tube 204 that is typically latched to the opposing sidewall.

The latch mechanism according 100 to the present invention is designed for use with the above-described center gate and comprises a latch member 110 and a corresponding track 120. The latch member includes a post 111 having an upper end and a lower end 115 that is securable within the track 120 to prevent an animal from forcing the gate open against a worker. Mounted on the post are a plurality of retainers 114, each having a fastener 117 extending therefrom for securing the latch to the free edge of the center gate. The fasteners 117 could be any combination of screws, nuts, bolts, U-bolts or similar fasteners. At the upper end of the post is a horizontal lifting lever 112 that rides within a U-shaped notch 116 formed on an uppermost retainer. A spring 113 positioned between an intermediate retainer and a flange or pin biases the post in a lowered position. When the lever 112 engages a lower edge of the notch 116, the lower end 115 of the post is positioned immediately above the bottom surface of the track.

The track 120 is embedded within the truck bed and traverses an arcuate path corresponding to the path of the center gate's free edge 203 when moving between fully opened and fully closed positions. The track 120 includes a series of juxtaposed, segregated compartments 121 for receiving the lower end of the post 115. Each compartment preferably includes drain apertures 122 that align with holes drilled into the trailer bed to prevent debris and moisture accumulation. Mounting brackets 123 on each of two sides of the track allow attachment of wooden strips to minimize impact damage to an animal's hoof when stepping on the track. Accordingly, the center gate can be locked in a multitude of angular positions between the fully open and fully closed positions by lifting the lever and releasing it into one of the compartments 121. When the post is seated within a compartment, it will prevent an animal from forcing the gate open.

Now referring to FIGS. 8-13, a second embodiment 100 similar to the first embodiment includes a latch assembly 130 and a track 140. The latch assembly includes a post 131 having an upper end and a lower end. Mounted on the post are a plurality of retainers 134, each having a fastener 137 extending therefrom for securing the latch to the free edge of the center gate. The fasteners 137 could be any combination of screws, nuts, bolts, U-bolts or similar fasteners. At the upper end of the post is a lifting lever 132 that rides within a U-shaped notch 136 formed on an uppermost retainer. A spring 133 positioned between an intermediate retainer and a flange or pin biases the post in a lowered position.

The latch mechanism further includes an arcuate track 140 embedded within the truck bed that traverses the path of the center gate's free edge 203 when moving between fully opened and fully closed positions. The track 140 includes a series of juxtaposed, segregated compartments 141 for receiving a lower end of the post. Each compartment preferably includes drain apertures 142 that align with holes drilled into the trailer bed to prevent debris and moisture accumulation. Mounting brackets 143 on each of two sides of the track allow attachment of wooden strips to minimize impact damage to an animal's hoof when stepping on the track. Accordingly, the center gate can be locked in a multitude of angular positions between the fully open and fully closed positions by lifting and releasing the lever allowing the spring to thrust it into one of the compartments.

Figure 9A:
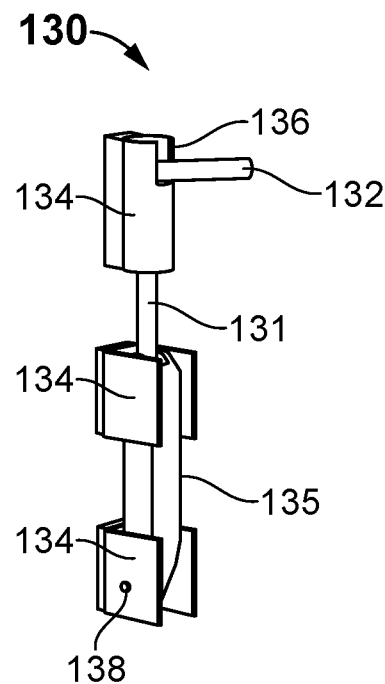
FIG. 9A is a perspective view of the foot latch in a disengaged position.
Figure 9B:
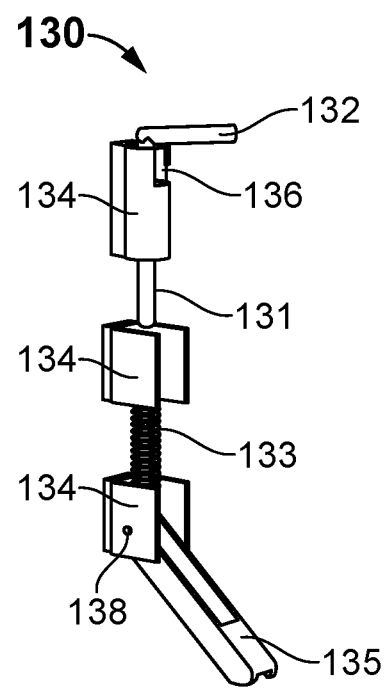
FIG. 9B is a perspective view of the foot latch in an engaged position.

Pivotally attached to a lowermost retainer is a deployable foot latch 135 for seating within a designated compartment. The foot latch is connected to the post by a pipe hinge whereby downward displacement of the post retracts the foot latch into a recess in an intermediate retainer as depicted in FIG. 9A. When the lever is grasped and lifted by a user, the foot latch is deployed to a lowered, angular positioned as depicted in FIG. 9B.

Figure 10:
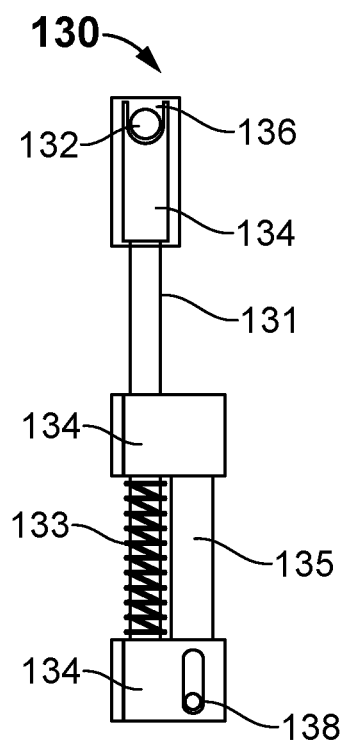
FIG. 10 is an isolated, front view of the foot latch.
Figure 11:
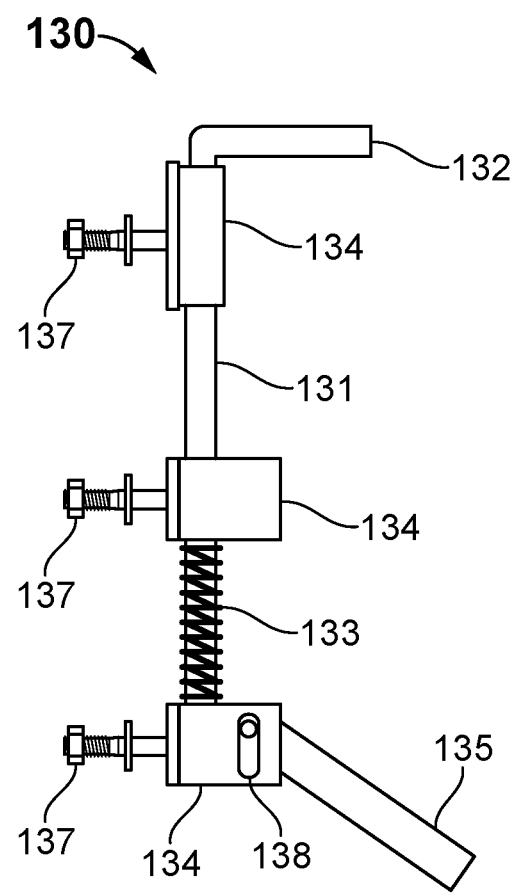
FIG. 11 is an isolated, side view of the foot latch.
Figure 12:
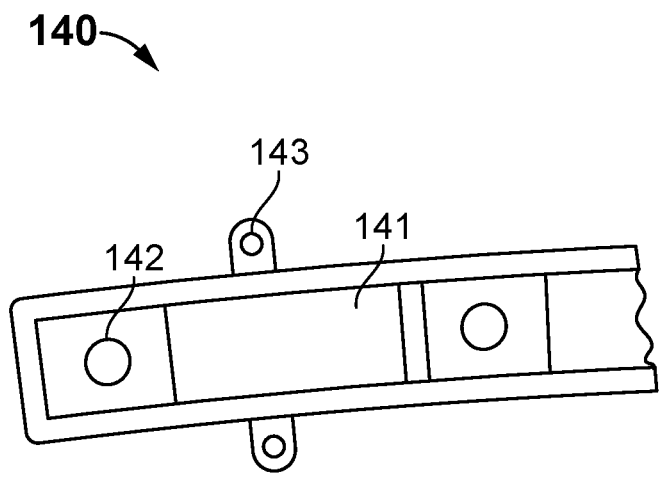
FIG. 12 is a top, sectional view of the track according to the second embodiment of the present invention.
Figure 13:
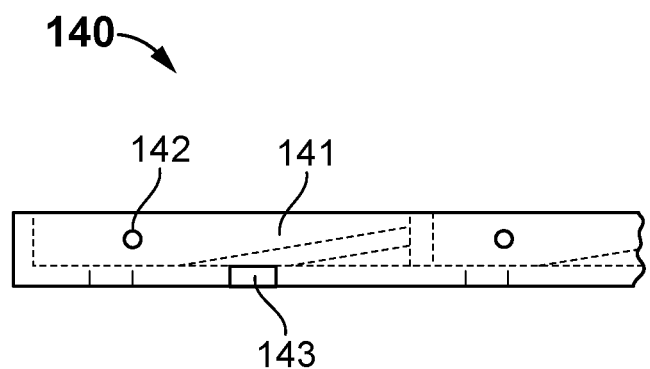
FIG. 13 is a side, sectional view of the track of FIG. 12.

As depicted in FIGS. 10 and 11, the foot latch could also be deployed by a pin that rides within a slot 138 on a lowermost retainer to guide the foot latch between deployed and retracted orientations. The foot latch provides additional anchoring capability by engaging the vertical partition separating two adjacent compartments. As depicted in FIG. 13, each compartment may include an upwardly inclined surface to further resist displacement of the foot latch.

The above-described device is not limited to the exact details of construction and enumeration of parts provided herein. Furthermore, the size, shape and materials of construction of the various components can be varied without departing from the spirit of the present invention.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. In combination with a livestock trailer having a horizontal bed with an internal swinging gate for segregating animals, said gate having a first edge hingedly connected to a trailer sidewall and a second free edge that is removably attachable to an opposing trailer sidewall, a latch mechanism comprising:
   a spring-biased post attached to the second free edge of said swinging gate, said post having an upper end and a lower end;
   an arcuate track embedded within said truck bed, said arcuate track tracing a path of the second free edge of the swinging gate, said arcuate track including a series of juxtaposed, segregated compartments for receiving the lower end of the post to fix said swinging gate in a select angular position whereby said center gate is fixable in a multitude of angular positions along the path of the second free edge by positioning the lower end of said post in one of the compartments to prevent an animal from moving said swinging gate.

2. The latch mechanism according to claim 1 wherein said post includes a plurality of retainers mounted thereon, each of said retainers having a fastener for securing said post to said second free edge.

3. The latch mechanism according to claim 2 further comprising a horizontal lifting lever at the upper end of said post for lifting said post from one of said segregated compartments.

4. The latch mechanism according to claim 3 wherein said lifting lever rides within a U-shaped notch formed on an uppermost of said retainers.

5. The latch mechanism according to claim 1 wherein each of said segregated compartments includes a drain aperture that aligns with a hole in said horizontal bed to prevent debris and moisture accumulation.

6. The latch mechanism according to claim 2 further comprising a deployable foot latch pivotally attached to a lowermost of said retainers for seating within a segregated compartment.

7. The latch mechanism according to claim 6 wherein said foot latch is operably connected to said post whereby downward displacement of the post retracts the foot latch into a recess in one of said retainers and when said lever is grasped and lifted by a user, the foot latch is deployed to a lowered, angular orientation and positioned within one of said segregated compartments.

8. The latch mechanism according to claim 7 wherein each of said segregated compartments includes an upwardly inclined surface to resist displacement of said foot latch.

9. A livestock trailer latching mechanism comprising:
   a horizontal bed and a pair of opposing sidewalls;
   an internal swinging gate having a first edge hingedly connected to one of said sidewalls and an opposing, second free edge that is securable to another of said opposing sidewalls, said second free edge traversing an arcuate path on said horizontal bed that extends from said one of said sidewalls to another of said sidewalls;
   a spring-biased post attached to the second free edge of said swinging gate, said spring-biased post having an upper end and a lower end;
   an arcuate track embedded within said truck bed and tracing said arcuate path, said arcuate track including a series of juxtaposed, segregated compartments for receiving the lower end of the spring-biased post, whereby said center gate is fixable in a multitude of angular positions along said arcuate track by positioning the lower end of said spring-biased post in one of the compartments to prevent an animal from moving said swinging gate.

* * * * *